United States Patent [19]

McCotter, Jr.

[11] Patent Number: 5,397,279

[45] Date of Patent: Mar. 14, 1995

[54] HIGH SPEED, RADIAL BALL, TRACTION TRANSMISSION

[76] Inventor: Geraco R. McCotter, Jr., Rte. 2 Box 895, Collinsville, Okla. 74021-9421

[21] Appl. No.: 38,906

[22] Filed: Feb. 11, 1993

[51] Int. Cl.⁶ .................. F16H 13/04; F16H 13/08
[52] U.S. Cl. ................................. 475/196; 476/36
[58] Field of Search ................. 476/36, 37, 38; 475/196

[56] References Cited

U.S. PATENT DOCUMENTS

| | | | |
|---|---|---|---|
| 1,399,442 | 12/1921 | Rennerfelt | 475/196 X |
| 2,528,470 | 10/1950 | Elder | 475/196 |
| 3,144,789 | 8/1964 | Ladin | 475/196 |
| 5,236,403 | 8/1993 | Schievelbusch | 475/196 X |

FOREIGN PATENT DOCUMENTS

| | | | |
|---|---|---|---|
| 1016809 | 11/1952 | France | 475/196 |
| 55-940052 | 7/1980 | Japan | 476/36 |
| 908929 | 10/1962 | United Kingdom | 475/196 |
| 1229484 | 5/1986 | U.S.S.R. | 476/36 |

*Primary Examiner*—Allan D. Herrmann

[57] ABSTRACT

The invention, an improved radial ball, traction transmission capable of bearing component speeds in excess of 20,000 RPM, connecting the output shaft of a motor or power source to the output shaft of the transmission for the purpose of transferring input torque by RPM reduction or augmentation through the incorporation of a commercially manufactured, standard ball bearing assembly in two basic configurations where: The inner race is driven by the input power source and the output shaft is being driven by the movement of the rotating balls with the outer race secured in a fixed but adjustable position. An adjustable bearing support ring is incorporated that allows the ball bearing and it's elements to be centered, balanced and adjusted to critical clearances, or, where the inner race is driven by the input power source and the output shaft is driven by the outer race with the ball separator cages secured in a fixed but adjustable position allowing the ball separator cages and rotating elements to be centered, balanced and adjusted to critical clearances necessary for high input speeds. Also incorporated, is a threaded, rear motor support housing that permits variable and precision pressure control upon the ball bearing assembly while the invention is operating at peak RPM, permitting a non-slip start yet still maintaining a more precise torque limiting capability.

2 Claims, 2 Drawing Sheets

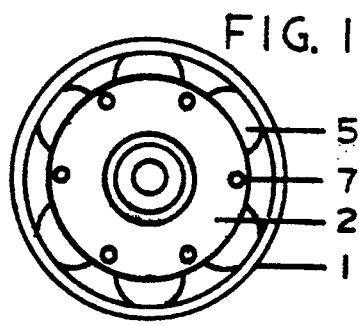
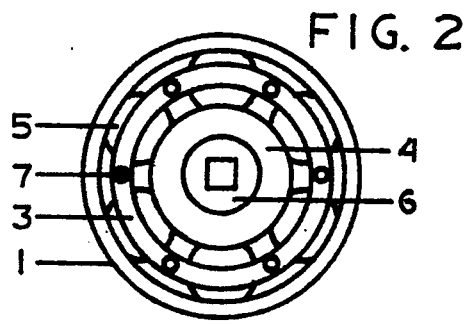
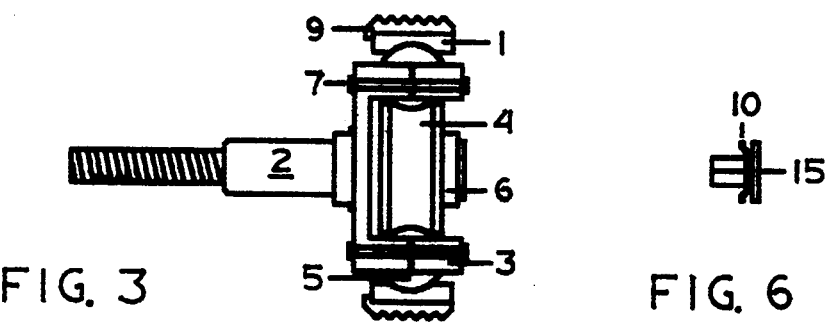
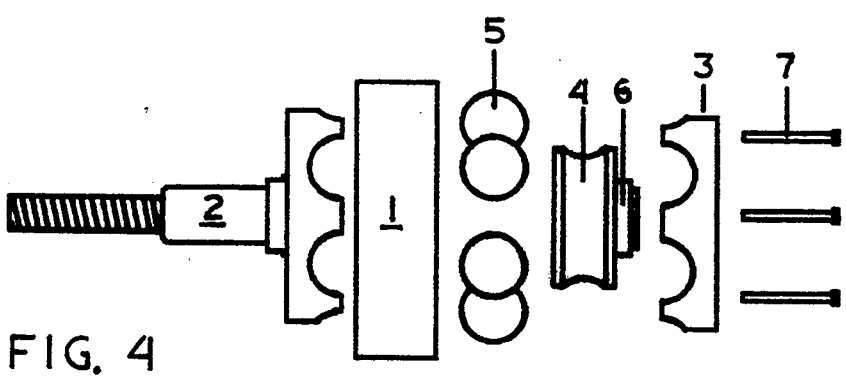
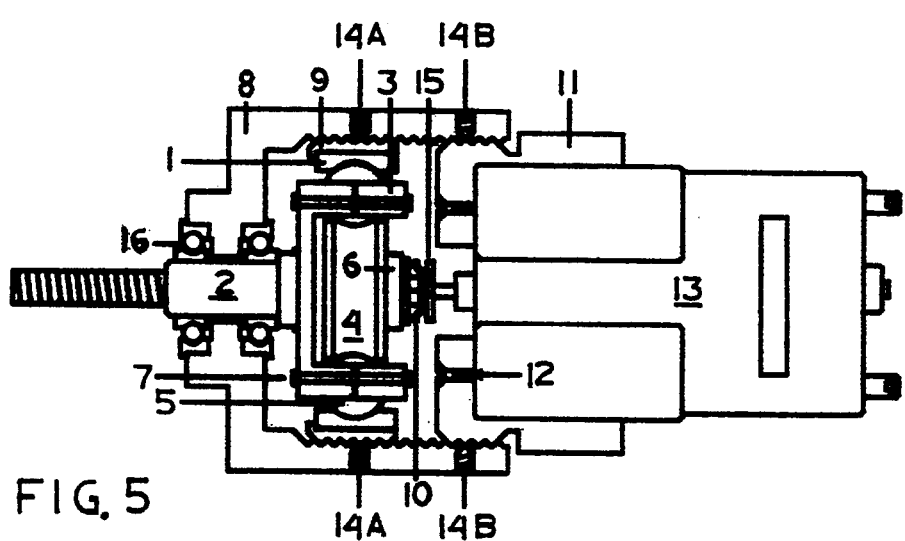

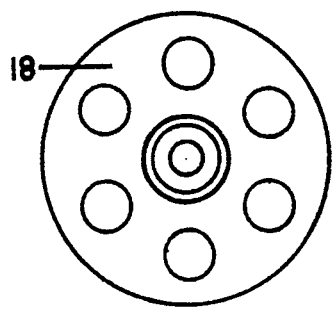
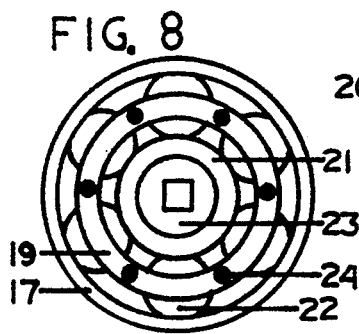
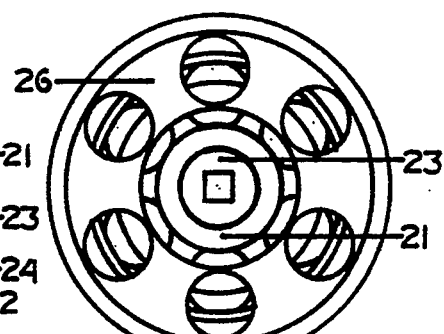
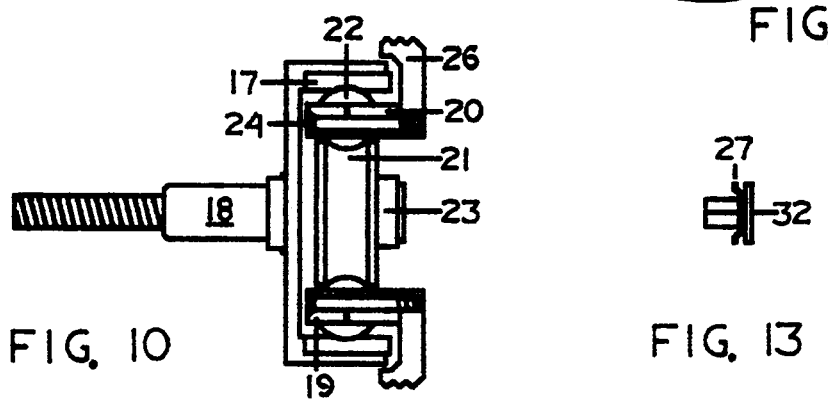
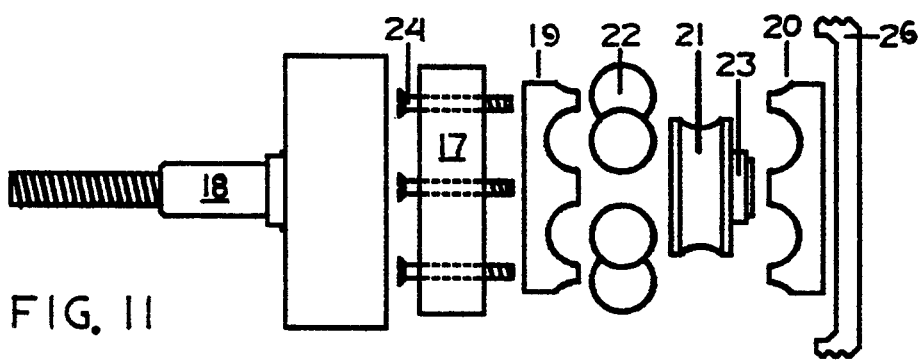
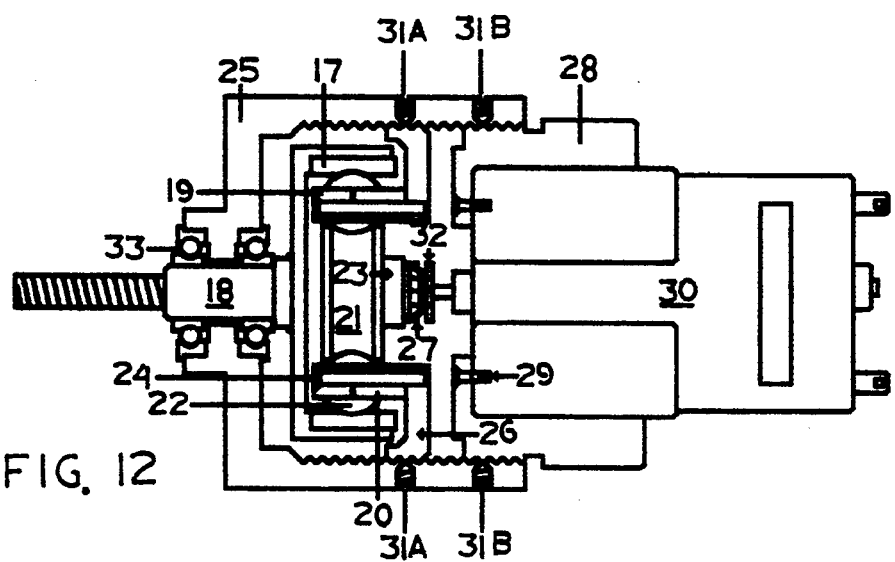

HIGH SPEED, RADIAL BALL, TRACTION TRANSMISSION

CROSS-REFERENCES TO RELATED APPLICATIONS

| REFERENCES CITED | | | |
| --- | --- | --- | --- |
| 1) T. R. Rennerfelt | Pat. # 1,399,442 | Dec. 6, 1921 | USA |
| 2) I. L. Elder | Pat. # 2,528,470 | Oct. 31, 1950 | USA |
| 3) Socie'te' De Recherches Techniques Rec Tec | Pat. # 1,016,809 | Nov. 24, 1952 | FR |
| 4) Stanley-Bridges Ltd. | Pat. # 908,929 | Oct. 24, 1962 | GT. BRIT |
| 5) E. M. Ladin | Pat. # 3,144,789 | Aug. 18, 1964 | USA |
| 6) Kirn | Pat. # SU 1229484 | July 5, 1986 | USSR |

BACKGROUND

1. Field of the Invention

The invention relates to an improved high torque planetary drive utilizing a ball bearing, traction application as the speed reduction means and, principally, to an improved ball bearing reduction transmission that incorporates an adjustable bearing support and traction mechanism for input speeds of over 20,000 RPM.

It is the object of this invention to provide an improved method of RPM, torque and mechanical power transmission that utilizes standard, production ball bearing assemblies as the major transmission component, thus eliminating extensive engineering design requirements for two piece outer races and special bearing parts while providing a reduction transmission exhibiting extremely efficient operating characteristics. The utilization of the standard ball bearing in this invention as a drive component, allows the ball structure to overcome the increased drag due to a jam or hard stop by allowing the balls to slip and continue rolling within the bearing structures with little or no damage.

2. Description of the Prior Art

With respect to past traction transmissions, the object of this ball bearing, traction application, is to improve upon the performance of previous speed reduction designs to provide an extremely low starting torque, smooth and vibration free operation at bearing component speeds over 20,000 RPM for extended periods of time. The invention also reduces the amount of direct pressure between the rolling elements and output shaft components that is associated with most traction drives while eliminating the need for traction increasing fluids.

In industrial applications, particularly those used for fans and electric motor driven drills, output speed has been sacrificed for an increase in torque. Speed reduction designs cited in the aforementioned references have not addressed high speed operation. Examples of published speeds in these references are between 1000 and 2000 RPM for the input shaft and 400 to 800 RPM for the output shaft. Inefficiencies of these designs include, loose and unbalanced output shaft couplings, heavily bushed contact surfaces between the input shaft and the output shaft and excessive positive pressure exerted upon the output shaft and the rotating ball structures. These inefficiencies have proved to be destructive, causing vibration, excessive bearing temperatures and the disintegration of the ball bearing assembly, particularly, when input shaft and bearing component speeds approach 20,000 RPM and output shaft speeds that approach 10,000 RPM.

EMBODIMENT

SUMMARY

Accordingly, the invention adapts standard, production ball bearings in a number of configurations to produce the required RPM reduction or augmentation as required. Two basic design configurations will be illustrated that provide different rates of RPM reduction or augmentation. It is to be understood that the invention shall not be limited to these configurations. It is also to be understood that while the ball bearing has been found to be most desirable, the invention shall not be limited to the bearing types illustrated or exclude other bearing designs. These include single and double row, radial or tandem bearing designs as well as roller type bearings.

The invention includes three vital components that set it apart from all previous ball bearing, traction transmissions.

1) A threaded bearing support ring provides for forward, rearward and side movement of the ball bearing. This allows critical adjustments for clearances and centered alignment of the bearing necessary for high speed operation.
2) A threaded security ring that allows the ball separator cages to be centered and adjusted to critical clearances for high speed operation.
3) A threaded motor support housing, allowing precision pressure adjustments to the bearing assembly while the invention is operating at peak RPM. This support housing may be secured at a fixed pressure adjustment or controlled by mechanical or electromechanical means to provide variable pressure that may be required while the invention is operating.

These components are vital to the high speed operation of the invention in a number of design configurations.

Configuration No. 1

In this configuration, the output shaft of the invention is attached, engaged against or takes the place of the ball spacer cage. Through a shaft driven spline, the ball bearing is subjected to forward pressure on the inner race, This axial loading produces a shear force between the bearing elements and creates an increased angular contact between the inner race, the balls, and outer race to provide a rolling action that produces an RPM reduction as the inner race rotates. With the output shaft engaged, the ball separator cage rotates with the balls and transmits the rotational energy to the output shaft. The bearing is adjusted in a fore and aft direction to provide maximum output shaft engagement with no positive or forward pressure exerted upon the shaft, balls or ball spacer cage elements and allows a sidle movement to correct for center alignment of the rotating elements. The forward, axial pressure is adjusted and controlled through the screw action of the coupled housings allowing the invention to be fine tuned and controlled, thus providing the correct amount of traction required.

Configuration No. 2

In this configuration, the output shaft can be:
1) manufactured to include the outer race as a single unit.

2) attached to the outer race.

3) machined to encircle the outer race with a press fit.

The ball separator cage is fastened to a security ring and remains stationary. The ball bearing assembly is then subjected to axial pressure between the inner race, the balls and the outer race. The security ring attached to the ball spacer cage elements is adjusted in a fore and aft direction to maintain critical clearances between the balls and spacer cage so that no positive or forward pressure is exerted upon them and to provide a sidle movement to correct for center alignment of the rotating elements. Once again, the forward, axial pressure produces a shear force between the bearing elements and creates increased angular contact between the inner race, the balls, and the outer race to provide a rolling action and RPM reduction as the inner race rotates. The outer race rotates due to the rolling action of the balls and transmits the rotational energy to the output shaft. This forward, axial pressure is adjusted and controlled through the screw action of the coupled housings allowing the invention to be fine tuned and controlled, thus providing the correct amount of traction required.

With reference to the present invention, once the ball bearing and output shaft have been assembled or engaged, the angular contact surfaces of the ball bearing may be ground and lapped with a fine grinding compound and then cleaned. This grinding removes the fine, polished surfaces of the balls and angular contact areas of the races providing a rough, pressure sensitive surface. Without grinding these surfaces, the inner race and balls may have a tendency to slip excessively under high drive torque and RPM. This grinding, while not always necessary, is particularly critical when the balls and or races are formed or machined from low friction plastics, resins or composites.

Referring to the invention as described in configurations 1 and 2, it shall be understood that, the use of roller and multiple row bearing assemblies, allowing the power to be taken from two or more separate drive components of the bearing, In most cases these can include rotations in clockwise or counter-clockwise directions and allows for multiple as well as contra-rotating shaft configurations, Other objects and advantages of the invention will, in part, be obvious, and will, be apparent from the specification. The invention accordingly comprises an article of manufacture possessing the features, properties, and relation of elements which will be exemplified in the article hereinafter described and the scope of the invention will be indicated in the claims.

DESCRIPTION OF DRAWINGS

It shall be understood, that shading and graphical representation of material types and texture have been eliminated from the drawings so as not to limit the individual parts of the invention to any particular material composition. Certain changes in materials and texture may have been made to enhance or alter the invention's operational characteristics without departing from the spirit and scope of the invention as described in the following specification.

For a more complete understanding of the nature and objects of the invention, reference is made to the following description taken in conjunction with the accompanying drawings that appear on sheets 1 and 2, showing the two major output configurations, and in which:

Sheet 1, shows the invention in it's various views with the output shaft utilizing the ball spacer cage as the rotary output drive component previously described as configuration 1.

FIG. 1 is a front view of the ball bearing, traction drive assembly with the output shaft attached according to the invention.

FIG. 2 is a rear view of the ball bearing, traction drive assembly showing the related parts fastened in place according to the invention.

FIG. 3 is a cross-sectional view from the left side of the ball bearing, traction drive assembly showing the related parts fastened in place according to the invention.

FIG. 4 is an exploded view showing the individual parts of the ball bearing, traction drive assembly as they appear before assembly, according to the invention.

FIG. 5 is a cross sectional view from the left side showing the invention with all of the related parts assembled in their operational positions and proper orientations.

FIG. 6 is the motor drive spline with machined flange, and spring washer.

Sheet 2 shows the invention in it's various views with the output shaft utilizing the outer race of the ball bearing assembly as the rotary output drive component previously described as configuration 2.

FIG. 7 is a front view of the output shaft into which the outer race of the ball bearing assembly will be pressed and secured. The screw access holes are clearly visible.

FIG. 8 is a front view of the ball bearing, assembly before being pressed into the machined output shaft and before the threaded security/ring is installed.

FIG. 9 is a rear view of the ball bearing, traction drive assembly and shows the threaded security ring attached to the ball separator cage with related bearing parts partially visible through the air passages in the ring.

FIG. 10 is a cross-sectional view from the left side of the ball bearing, traction drive assembly showing the related parts fastened in place according to the invention as illustrated in FIG. 12.

FIG. 11 is an exploded view showing the individual parts of the ball bearing, traction drive assembly as they appear before assembly, according to the invention.

FIG. 12 is a cross sectional view from the left side showing the invention with all of the related parts assembled in their operational positions and proper orientations.

FIG. 13 is the motor drive spline with machined flange, and spring washer.

DESCRIPTION OF THE PREFERRED EMBODIMENTS

Sheet 1 (Output Shaft Configuration 1)

FIGS. 1 and 2 represent the ball bearing, traction drive assembly of the invention showing it from the front and rear views and illustrates the position of the parts as they appear assembled in their proper orientations.

FIG. 1 illustrates the front view and shows the outer bearing race, item 1, of the ball bearing assembly with a keyway for anti-rotation purposes. Item 2 is the output shaft fastened in place with six rivets, items 7, and covering almost the entire bearing face with only the six balls, item 5, as well as the outer race showing at the edge. The number of rivets is determined by the number of balls and spaces between them. The inner race, item 4, internal spline bushing, item 6, and the rear ball spacer cage, item 3, are not visible in this illustration.

FIG. 2 illustrates the rear view and shows the outer race, item 1, rear ball separator cage, item 3, with rivets, items 7, the inner race, item 4, the balls, items 5, and the internal spline bushing, item 6. The output shaft, item 2, is not visible in this figure and the threaded, bearing support ring, item 9, is not installed.

FIG. 3 shows the ball bearing, traction drive assembly from a left side perspective in it's fully assembled state. It should be obvious that the output shaft, item 2 and the rear ball separator cage, item 3, are machined to the shape and clearances of the balls, items 5, fastened together by rivets, items 7, and takes the place of the ball separator cage that was removed from the original ball bearing assembly. The threaded bearing support ring, item 9, is shown encircling the outer race, item 1, along with the inner race, item 4, with internal spline bushing, item 6. It should also be understood that the invention shall not be limited to this particular drive shaft and ball separator adaptation. Production models of the invention have been created and operated successfully utilizing a variety of output shaft mountings with:

(1) the output shaft, item 2, machined to the dimensions and clearances of the existing ball separator cage. After removing the existing rivets, the output shaft and original ball separator cage are then riveted together to form a single cage assembly. The rear ball separator cage, item 3, is not necessary in this mounting configuration. This configuration is not illustrated in the various views and drawings displayed on sheet 1 of this specification but still falls within the spirit and scope of the invention.

(2) the output shaft, item 2, machined to the dimensions and clearances of the balls and acting as the ball separator cage so that it can be assembled with a self-retaining, snap fit around the balls. The rear ball separator cage, item 3 and rivets, items 7, are not required in this mounting configuration. This configuration is not illustrated in the various views and drawings displayed on sheet 1 of this specification but still falls within the spirit and scope of the invention.

(3) the output shaft, item 2, machined to the dimensions of the existing ball separator cage. In this configuration, the output shaft is held against the existing ball separator cage. With the output shaft conforming to the contour of the existing ball separator cage, the output shaft and ball separator cage turn together as if they were a single assembly. Items 3 and 7 are not required in this configuration. It is not illustrated in any views or drawings within sheet 1 of this specification but still falls within the spirit and scope of the invention.

FIG. 4 shows an exploded view from the left side and illustrates the individual parts of the ball bearing, traction drive assembly in their order of assembly. With the exception of item 9, all parts retain the same numbers and similarly described as in FIG. 3. The contour machining of the output shaft, item 2, and the rear separator cage, item 3, is shown more clearly. The view also represents a bearing with a six ball configuration. The number of balls will vary depending on the type and size of the bearing utilized.

FIG. 5 shows the bearing pressed into a threaded, bearing support ring, item 9, which is screwed into and located within the internally threaded, front bearing housing, item 8, with the output shaft, item 2, passing through the support bearings, items 16, and coming in direct contact with the rear support bearing. Fore and Aft movement of the threaded, bearing support ring, item 9, sets critical clearances between the balls, items 5 and the output shaft, item 2. Sidle movement of the threaded, bearing support ring, item 9, is facilitated through adjustment of the set screws items 14A and permits critical centering and alignment of the bearing and driven components and provides a locking action. The drive motor, item 13 is secured in place by screws, items 12, within the externally threaded, motor support housing, item 11. It should be noted and understood that the motor and support housing assembly, items 30 and 11, is then screwed into the front bearing housing, item 8, allowing the drive spline with rear flange, item 15, to engage the internal spline bushing, item 6. The drive spline with rear flange, item 15, is attached to the drive shaft of the motor, item 13 and is allowed to slide freely within the internal spline bushing, item 6. A spring washer, item 10, is installed between the rear flange of the drive spline, item 15 and the internal spline bushing, item 6, to keep constant forward pressure on the inner race, item 4, as the support housings are screwed together for traction adjustments. As the inner race, item 4, moves forward, the balls, items 5 are placed under increased angular contact between the forward edge of the outer race, item 1 and the rear edge of the inner race, item 4. As the inner race, item 4 and the balls, items 5, rotate within the outer race, item 1, rotational energy is transmitted to the output shaft, item 2, causing it to rotate with the balls. More than one spring washer or a standard spring may be added to maintain forward pressure as may be required under operating loads. The set screws, items 14B, are used to provide friction or to lock the internally threaded bearing support housing and externally threaded motor support housings, items 8 and 11 in their final positions after adjustments have been made.

Referring again to FIG. 5, with the threaded, bearing support ring, item 9, installed within the forward bearing housing, item 8, the bearing is adjusted and held by the set screws, items 14A, in a centered position and maintains critical clearances between the output shaft, item 2 and the balls, items 5, of the bearing. This assures that there is maximum engagement and no pressure exerted between the output shaft, item 2 and the balls, items 5. This clearance adjustment is critical for high speed operation. Through the screw action of the threaded portions of the housings items 8 and 11, in and out, the amount of pressure exerted on the inner race, item 4, can be increased or decreased to vary the amount of traction between the balls and race components with forward pressure on the inner race, item 4, being maintained by the spring washer, item 10. As the balls rotate within the bearing races, and being driven by rotary pressure exerted by the inner race, the output shaft, item 2, is made to revolve with the balls thus transmitting energy from the input shaft of the motor, item 13, to the output shaft, item 2. It should be noted that the screw action between the threaded components, items 8, 9, and 11, allows the invention to be adjusted and controlled while the invention is operating to achieve maximum rotary and friction characteristics necessary for satisfactory transmission of torque and high RPM between the input shaft and the output shaft.

FIG. 6 illustrates the motor drive spline with machined flange, item 15, and the spring washer, item 10, used to maintain operating pressure between the motor drive spline, item 15 and inner race, item 4, of the ball bearing, traction drive assembly.

Sheet 2 (Output Shaft Configuration 2)

FIG. 7 shows the output shaft, item 18, from the front. The six holes visible on the front face of the output shaft bearing cup, are used for screw access and final assembly of the ball bearing, traction drive assembly as illustrated in FIG. 9.

FIG. 8 illustrates the ball bearing assembly from the front and shows the outer race, item 17, inner race, item 21, internal spline bushing, item 23, front ball spacer cage, item 19. The rear ball separator cage, item 20, is installed but not visible in this view. Six screws, items 24, are visible and are used to attach the ball separator cages, items 19 and 20 to the threaded security ring, item 26. The threaded security ring, item 26, is not installed in this view.

FIG. 9 shows a rear view of the threaded security ring, item 26, attached directly to the ball separator cages, items 19 and 20, to hold them stationary as the remaining ball bearing components rotate. Portions of the ball bearing components can be seen in front of the threaded security ring, item 26, through the air passages. These passages allow air flow through the ring and allows for bearing and drive motor cooling.

FIG. 10 shows the ball bearing, traction drive assembly from a left side perspective and in a cross sectional view showing it in a fully assembled state. The bearing assembly including the balls, items 22, the races, items 17 and 21, and the ball separator cages, items 19 and 20 are assembled with the screws, items 24, passing through them. The threaded security ring, item 26, is not installed and the screws, items 24, are left loose until the bearing outer race, item 17, has been pressed into the bearing retainer cup of the output shaft, item 18. Once the bearing has been pressed into place, the threaded security ring, item 26, can now be attached to the rear ball separator cages, items 19 and 20, with the six screws, items 24. The holes in the bearing cup of the output shaft, item 18, as illustrated in FIG. 7 allows screwdriver access to tighten the six screws, items 24. It should be obvious that press installation of the outer race, item 17, of the bearing into the bearing cup of the output shaft, item 18, with the threaded security ring, item 26, installed causes damage to the threaded security ring, item 26, and ball separator cages, items 19 and 20.

FIG. 11 shows an exploded view from the left side and illustrates the individual parts of the ball bearing, traction drive assembly. The screws, items 24 can be seen floating in position within the outer race, item 17. The output shaft, item 18, the outer race, item 17, the screws, items 24, the forward ball separator cage, item 19, the balls items 22, the inner race, item 21, the drive spline bushing, item 23, the rear ball separator cage, item 20 and the threaded security ring, item 26, are shown in their order of assembly.

FIG. 12 shows the invention from the left side in a cross-sectional view and in it's fully assembled state. The ball bearing, traction drive assembly with the externally threaded, security ring, item 26, installed, is screwed into and located within the internally threaded, front support housing, item 25, with the output shaft, item 18, passing through the support bearings, items 33, and coming in direct contact with the rear support bearing, item 33. Fore and aft movement of the threaded security ring, item 26, sets critical clearances between the balls, items 22 and the ball separator cages, items 19 and 20. This positions the ball separator cages, items 19 and 20, so that they do not exhibit any pressure against the balls, items 22. Sidle movement of the threaded security ring, item 26, is facilitated through adjustment of the set screws, items 31A, and permits critical centering and alignment of the ball separator cages, items 19 and 20 together with a locking action. Once again, this adjustment is critical to high speed operation of the invention. The drive motor, item 30, is secured in place by screws, items 29 within an externally threaded, motor support housing, item 28. It should be noted and understood that the support housing with motor, items 28 and 30 is then screwed into the internally threaded, front support housing, item 25, allowing the motor drive spline with rear flange, item 32, to engage the internal spline bushing, item 23. The motor drive spline with rear flange, item 23, is attached to the drive shaft of the motor, item 30, and is allowed to slide freely within the internal spline bushing, item 23. A spring washer, item 27, is installed between the rear flange of the motor drive spline, item 32, and the internal spline bushing, item 23, to keep constant forward pressure on the inner race, item 21, as the support housings are screwed inward for traction adjustments. As the inner race, item 21, moves forward, the balls, items 22, are placed under increased angular contact between the forward edge of the outer race, item 17 and the rear edge of the inner race, item 21. As the inner race, item 21, and the balls, items 22, rotate within the outer race, item 17, rotational energy is transmitted to the output shaft, item 18, causing it to rotate with the balls. More than one spring washer, item 27, or a standard spring may be added to maintain forward pressure as may be required under operating loads. If the adjustment to the threaded security ring, item 26, is correct, the ball separator cages, items 19 and 20, should now be held stationary with no pressure exerted upon them, allowing the balls, items 22, to revolve freely within them at high RPM. Adjustments made while under an operating load can produce the desired traction that may be required. Once final adjustments have been made, the set screws, items 31A, are tightened to center the ball separator cages, items 19 and 20, and hold the threaded security ring, item 26, stationary within the forward support housing, item 25. The set screws, items 31B, are used to provide friction or to lock the threaded support housings, items 25 and 28, in their final positions after adjustments have been made.

Referring once again to FIG. 12. It should be noted that the screw action between the threaded components, items 25, 26, and 28, allows the invention to be adjusted and fine tuned to achieve maximum rotary and friction characteristics necessary for satisfactory transmission of torque and high RPM between the input shaft and the output shaft.

FIG. 13 illustrates the motor drive spline with machined flange, item 32, the spline also includes the spring washer, item 27, used to maintain pressure between the flange of the motor drive spline, item 32, and internal spline bushing, item 23, installed within the bore of the inner race, item 21, of the bearing assembly.

It will thus be seen that the objects set forth above, among those made apparent from the preceding description are efficiently attained and since certain changes may have been made in the above without departing from the spirit and scope of the invention, it is intended that all matter attained in the foregoing description or shown in the accompanying drawings shall be interpreted as illustrative and not limiting in any sense.

It is also to be understood that the following claims are intended to cover all generic and special features of the invention which, as a matter of language, might be said to fall between.

What is claimed is:

1. An improved, high speed, radial ball, traction transmission for the purpose of RPM reduction or augmentation comprising, a standard ball bearing assembly including inner and outer races, balls and ball separator disposed between said races, the outer race fixed within a spirally movable, threaded support ring and having an output shaft driven by the ball separator in an associative assemblage with said balls, a cylindrical, internally threaded, fixed housing, wherein the threaded support ring, ball bearing and output shaft is spirally disposed, said shaft extending through the open end of said housing, a rotary power source having a rotating, shaft driven spline and spring washer in an associative assemblage, disposed within a cylindrical, externally threaded housing with said housing being spirally coupled to said fixed, internally threaded housing, the driven spline sliding through, engaging, and pressing said spring washer against the rear face of said inner race, thus imparting an axial load upon said ball bearing assembly, wherein the increased angular contact between the races and balls to a lesser or greater degree, affects the revolution of the balls, ball separator and the output shaft, said spring washer maintaining traction pressure, and at the same time functioning as a torque limiter.

2. An improved, high speed, radial ball, traction transmission for the purpose of RPM reduction or augmentation comprising, a standard ball bearing assembly including inner and outer races, balls and ball separator disposed between said races, having the output shaft driven by the outer race in an associative assemblage, disposed within a cylindrical, internally threaded, fixed housing, with said shaft rotatably supported and extending through the open end of said housing, a moveable, threaded security ring, said ball separator, attached to said threaded security ring in an associative assemblage with the balls, is spirally disposed within said internally threaded housing, a power source having a rotating, shaft driven spline and spring washer in an associative assemblage, disposed within a cylindrical, externally threaded housing with said housing being spirally coupled to the said fixed, internally threaded housing, the driven spline, sliding through, engaging and pressing upon the rear face of the inner race, thus imparting an axial load upon said ball bearing assemblage, wherein the increased angular contact between the races and balls to a lesser or greater degree, affects the revolution of the balls, outer race and output shaft, said spring washer maintaining traction pressure and at the same time functioning as a torque limiter.

* * * * *

UNITED STATES PATENT AND TRADEMARK OFFICE
CERTIFICATE OF CORRECTION

PATENT NO. : 5,397,279
DATED : Mar. 14 1995
INVENTOR(S) : Gerald R. McCotter Jr.

It is certified that error appears in the above-indentified patent and that said Letters Patent is hereby corrected as shown below:

ON THE TITLE PAGE:

[76] Inventor:     Gerald R. McCotter, Jr., Rte 2 Box
should read as:    895, Collinsville, Okla, 74021-9421

Signed and Sealed this

Eleventh Day of July, 1995

Attest:

BRUCE LEHMAN

*Attesting Officer*     *Commissioner of Patents and Trademarks*